US009291239B2

(12) United States Patent
Nishimura

(10) Patent No.: US 9,291,239 B2
(45) Date of Patent: Mar. 22, 2016

(54) MOORING DEVICE AND STEERING MOORING MECHANISM USING SAME

(75) Inventor: Atsushi Nishimura, Takarazuka (JP)

(73) Assignee: HI-LEX CORPORATION, Takarazuka-shi (JP)

(*) Notice: Subject to any disclaimer, the term of this patent is extended or adjusted under 35 U.S.C. 154(b) by 210 days.

(21) Appl. No.: 13/880,433

(22) PCT Filed: Oct. 27, 2011

(86) PCT No.: PCT/JP2011/074740
§ 371 (c)(1),
(2), (4) Date: Apr. 19, 2013

(87) PCT Pub. No.: WO2012/057239
PCT Pub. Date: May 3, 2012

(65) Prior Publication Data
US 2013/0205547 A1    Aug. 15, 2013

(30) Foreign Application Priority Data

Oct. 28, 2010   (JP) .................................. 2010-242458

(51) Int. Cl.
*F16G 11/00*   (2006.01)
*B62D 1/16*    (2006.01)
*F16G 11/02*   (2006.01)

(52) U.S. Cl.
CPC ............... *F16G 11/025* (2013.01); *B62D 1/16* (2013.01); *F16G 11/02* (2013.01); *Y10T 24/318* (2015.01)

(58) Field of Classification Search
CPC ........ B62D 1/16; F16G 11/025; Y10T 24/318
USPC ..................... 280/771, 775, 777; 74/492, 493
See application file for complete search history.

(56) References Cited

U.S. PATENT DOCUMENTS 3,533,302 A * 10/1970 Hansen ........................... 74/493
4,172,503 A * 10/1979 Ishioka et al. ................ 180/313
(Continued)

FOREIGN PATENT DOCUMENTS

JP    S52-163658    12/1977
JP    H2-40118      3/1990
(Continued)

OTHER PUBLICATIONS

International Search Report for International Application No. PCT/JP2011/074740 dated Jan. 17, 2012.

*Primary Examiner* — Barry Gooden, Jr.
(74) *Attorney, Agent, or Firm* — Kratz, Quintos & Hanson, LLP

(57) ABSTRACT

It is an object to provide a mooring device capable of connecting weight members to each other easily and tightly and of preventing electric conduction between weight members and generating no noise or heat which causes malfunction. It is an object to provide a steering mooring mechanism using the mooring device. The mooring device has fixing members fixed to two electrically conductive members to be moored, and a metal connecting member connecting the fixing members, wherein at least one of the fixing members is configured as a non-conductive fixing member having a metal fixing body fixed to the member to be moored, and a coupling body made of non-conductive material for coupling the fixing body and the connecting member in a manner not to contact each other, such that the connecting member is non-conductive with respect to the member to be moored on the side of the non-conductive fixing member.

10 Claims, 4 Drawing Sheets

(56) References Cited

U.S. PATENT DOCUMENTS

Figure 1:
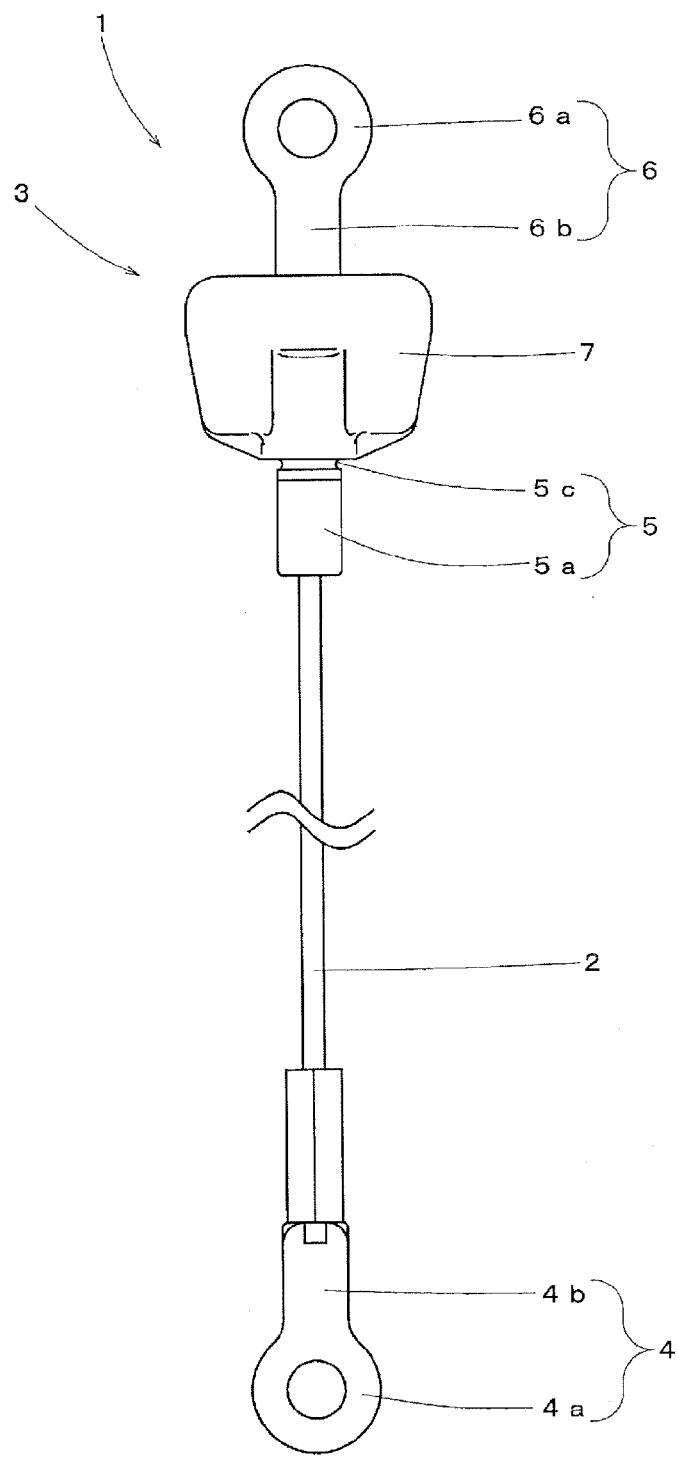

| | | | | |
|---|---|---|---|---|
| 4,330,139 | A * | 5/1982 | Katayama | 280/777 |
| 4,462,606 | A * | 7/1984 | Hon | 280/278 |
| 5,037,131 | A * | 8/1991 | Kuramoto et al. | 280/775 |
| RE34,359 | E * | 8/1993 | Matsumoto et al. | 74/493 |
| 5,439,252 | A * | 8/1995 | Oxley et al. | 280/775 |
| 5,481,937 | A * | 1/1996 | Uphaus et al. | 74/493 |
| 5,492,031 | A * | 2/1996 | Hedderly | 74/473.32 |
| 5,534,665 | A * | 7/1996 | Long | 174/72 A |
| 5,606,892 | A * | 3/1997 | Hedderly | 74/493 |
| 5,957,613 | A * | 9/1999 | Ruth | 403/48 |
| 6,390,505 | B1 * | 5/2002 | Wilson | 280/775 |
| 7,114,429 | B1 * | 10/2006 | Roethlisberger | 91/375 R |
| 7,165,786 | B1 * | 1/2007 | Sha et al. | 280/775 |
| 7,178,422 | B2 * | 2/2007 | Armstrong et al. | 74/493 |
| 7,297,871 | B2 * | 11/2007 | Watanabe et al. | 174/72 A |
| 8,668,226 | B2 * | 3/2014 | Hirose | B62D 1/185 280/775 |
| 8,723,039 | B2 * | 5/2014 | Fabiilli | 174/72 A |
| 9,016,160 | B2 * | 4/2015 | Ichie | B62D 1/185 280/775 |
| 2001/0007402 | A1 * | 7/2001 | Imai et al. | 310/91 |
| 2002/0066334 | A1 * | 6/2002 | Kim et al. | 74/493 |
| 2003/0015340 | A1 * | 1/2003 | Tsukamoto | 174/72 A |
| 2003/0079563 | A1 * | 5/2003 | Rouleau et al. | 74/493 |
| 2004/0144192 | A1 * | 7/2004 | Tomaru et al. | 74/492 |
| 2006/0022523 | A1 * | 2/2006 | Hasegawa | 307/10.1 |
| 2006/0119090 | A1 * | 6/2006 | Burr et al. | 280/775 |
| 2011/0308348 | A1 * | 12/2011 | Ichie | B62D 1/185 74/493 |

FOREIGN PATENT DOCUMENTS

| | | |
|---|---|---|
| JP | H2-48639 | 4/1990 |
| JP | H9-210140 | 8/1997 |
| JP | H11-178182 | 7/1999 |
| JP | 2002-191115 A1 | 7/2002 |

* cited by examiner (a)

(b)

MOORING DEVICE AND STEERING MOORING MECHANISM USING SAME

TECHNICAL FIELD

The present invention relates to a mooring device, particularly to a mooring device for mooring an electrically conductive weight member. Moreover, it relates to a steering mooring mechanism using the mooring device.

BACKGROUND ART

If two weight members, which are members heavy in weight, are connected by a connecting mechanism, it is concerned that one weight member comes off from the other weight member and falls, in the event of a damage of the connecting mechanism due to external impact or the like. Such fall of the weight member puts workers and the like in the vicinity in danger.

Then, in addition to the connecting mechanism, it is conceived to moor the two weight members by a mooring device. The mooring device has terminals mounted to both ends of a wire, the terminals of the one end and the other end being respectively fixed to the one and the other weight members so as to moor both members. Even if the connecting member is broken, the one weight member which could fall is prevented from falling down by being moored by this mooring device because it is tied to the other weight member.

Here, Patent Documents 1-3 disclose a wire rope or a control cable possibly used as the mooring device, as well.

In the wire rope disclosed in the Patent Document 1, a round-type electric wire terminal made of metal is calked at the end of a wire to be mounted. This wire rope is fixed to the weight member by fastening a bolt, which has been inserted into the round-type electric wire terminal, into a screw hole provided on the weight member.

Moreover, the control cable disclosed in the Patent Document 2 is made by mounting a terminal made of resin having a spherical concave portion to the end of a wire. This control cable is fixed to the weight member by fitting a pin having a spherical portion mounted to the weight member in the spherical concave portion formed on the terminal.

PRIOR ART DOCUMENTS

Patent Documents

Patent Document 1: JP 2-048639 U1
Patent Document 2: JP 2-040118 U1

SUMMARY OF THE INVENTION

Problem to be Solved by the Invention

However, in the wire rope disclosed in Patent Document 1, the wire made of metal and the round-type electric wire terminal are connected in a manner to allow electric conduction. Therefore, if this wire rope is used as a mooring device and when the two weight members are configured to be able to conduct electricity, electric conduction between both weight members occurs through the wire rope. In the event of such electric conduction, noise or heat that causes malfunction of electronic components, etc. provided in the vicinity can be generated. Therefore, the wire rope is not suitable for the use as a mooring device.

Moreover, because the control cable disclosed in Patent Document 2 uses the terminal made of resin, fixing strength of the terminal to the weight member is weaker. Therefore, this control cable is not suitable for the use as a mooring device, either.

The present invention is made in the light of the above problems, and it is an object to provide a mooring device capable of connecting weight members to each other easily and tightly and of preventing electric conduction between weight members and generating no noise or heat which causes malfunction of electronic components, etc. provided in the vicinity. In addition to that, it is an object of the present invention to provide a steering mooring mechanism using the mooring device.

Means to Solve the Problem

For achieving the above object, the mooring device of the present invention has fixing members fixed to each of two electrically conductive members to be moored, and a metal connecting member connecting the fixing members to each other, and at least one of the fixing members is configured as a non-conductive fixing member having a metal fixing body fixed to the member to be moored, and a coupling body made of non-conductive material for coupling the fixing body and the connecting member in a manner not to contact each other, such that the connecting member is non-conductive with respect to the member to be moored on the side where the non-conductive fixing member is fixed.

Effects of the Invention (1) In the mooring device of the present invention, the fixing body of the non-conductive fixing member fixed to the member to be moored is connected to the connecting member without contacting it by a coupling body, two electrically conductive members to be moored can be moored without electric conductivity between them, and no noise or heat causing malfunction of electronic components, etc.

provided in the vicinity is generated. Moreover, in this mooring device, because the fixing body is made of metal, it can be firmly fixed to the member to be moored.

(2) Because the mooring device of present invention uses the fixing body in which the fixing portion used when fixing to the members to be moored and the supporting portions connected to the connecting member by a coupling body are spaced apart by the extending portion, the fixing portion can be fixed to the member to be moored tightly and compactly without being affected by the coupling body. In addition, in this mooring device, the supporting portion of the fixing body covered by the coupling body is provided in a manner to extend in both directions perpendicular to the extending portion, and thus the fixing body can be prevented from coming off from the coupling body by distributing tensile force applied to the fixing body to the supporting portion.

(3) In the mooring device of the present invention, because side leg portions of the fixing body covered by the coupling body are provided in a manner to extend from the end of the supporting portion in parallel with the extending portion, the fixing body can be prevented from coming off from the coupling body by distributing torsional force applied to the fixing body to the side leg portion.

(4) In the mooring device of the present invention, because a concave portion of an end body mounted to the end of a connecting member fits in a coupling body, the terminal body can be prevented from coming off from the coupling body, upon the application of tensile force to the end body.

(5) The steering mooring mechanism of the present invention can moor a steering operating mechanism and a power steering mechanism for a vehicle, which are two electrically conductive members to be moored, tightly and without electrical conductivity between them.

BRIEF DESCRIPTION OF THE DRAWINGS (FIG. 1) A planar view of a mooring device of the present invention.

(FIG. 2(a)) An enlarged side view of a non-conductive fixing member.

(FIG. 2(b)) A sectional view along the line A-A of the non-conductive fixing member shown in (a).

(FIG. 3) A schematic side view of a steering mooring mechanism.

(FIG. 4) An enlarged side view of the steering mooring mechanism.

EMBODIMENT FOR CARRYING OUT THE INVENTION

The embodiments of the present invention will be described below with reference to drawings. As shown in FIG. 1, a mooring device of the present invention 1 is configured by a connecting member 2, a non-conductive fixing member 3 provided at one end of the connecting member 2 and an electrically conductive fixing member 4 provided at the other end of the connecting member 2.

Figure 2:
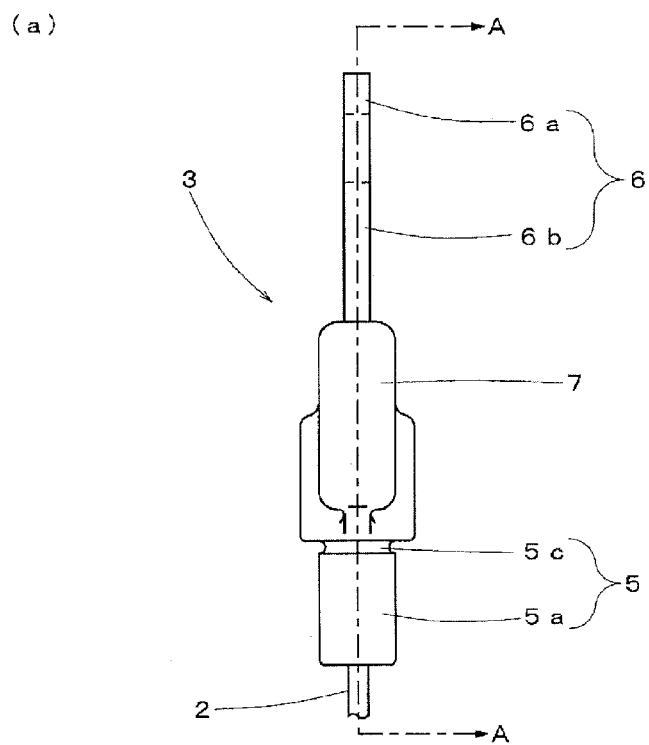
Figure 2:
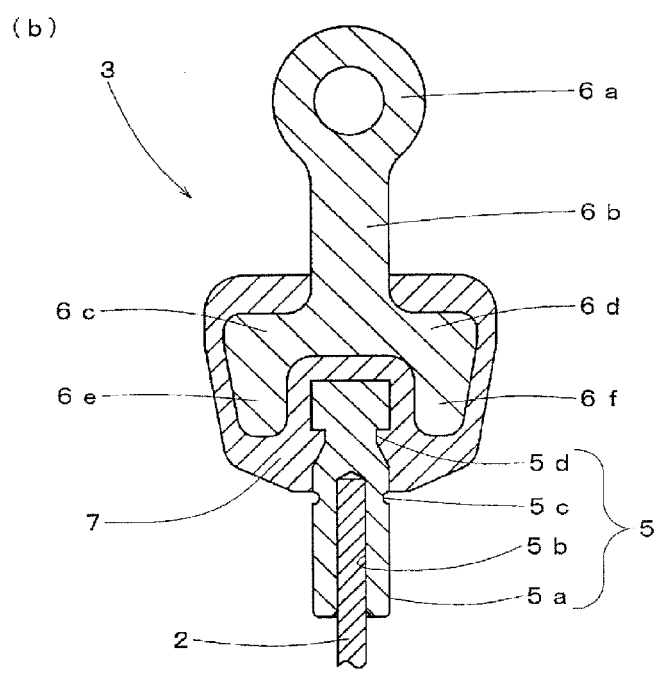

The connecting member 2 is a wire constituted by metal such as iron, as shown in FIG. 1 and FIG. 2.

An end body 5 made of metal is mounted at one end of the connecting member 2. As shown in FIG. 2(b), the end body 5 is formed such that a cylindrical main body portion 5a has a hole 5b opening at its one end to fix the connecting member 2, and a first concave portion 5c and a second concave portion 5d, which are annular grooves formed on its outer periphery, are formed with an appropriate distance inbetween.

After one end of the connecting member 2 is inserted into the hole 5b, the main body portion 5a is calked, whereby the end of the connecting member 2 is fixed.

The first concave portion 5c is formed in the vicinity of the center, in a longitudinal direction, of the main body portion 5a, its cross-sectional shape being substantially U-shaped. Moreover, the second concave portion 5d is provided substantially at the midpoint between the other end of the main body portion 5a and the first concave portion 5c. This second concave portion 5d is configured to have a bottom surface parallel to the longitudinal direction of the main body portion 5a, a lateral surface at the side of the one end of the main body portion 5a inclined to the first concave portion 5c side and a lateral surface at the side of the other end of the main body portion 5a perpendicular to the bottom surface.

As shown in FIG. 1 and FIG. 2, the non-conductive fixing member 3 comprises a fixing body 6 made of metal such as iron and a coupling body 7 coupling the fixing body 6 and the end body 5 in a manner not to contact each other, and made of resin material being hard and non-conductive such as polyamide.

The fixing body 6 is in a form of a plate, as represented in FIG. 2(b), and comprises a fixing portion 6a in which the side of its other end is formed in circular shape and a through-hole is formed at its center, an extending portion 6b extending straight from the fixing portion 6a in a predetermined direction, supporting portions 6c, 6d extending straight from both left and right sides of the front end of the extending portion 6b in both directions perpendicular to the extending portion 6b, and side leg portions 6e, 6f extending from the respective front ends of the supporting portions 6c, 6d toward the sides opposite to the extending portion 6b, in parallel to the extending portion 6b. By the way, the lateral surfaces of respective side leg portions 6e, 6f opposing each other extend at a slant so that the lateral surfaces gradually approach each other towards the side of its one end.

The coupling body 7, as well represented in FIG. 2(b), connects the end body 5 by covering the end body 5 from and excluding its first concave portion 5c to its other end, the supporting portions 6c, 6d and side leg portions 6e, 6f of the fixing body 6 with the resin material, with the other end of the end body 5 between the side leg portions 6e, 6f without allowing it to contact the side leg portions. In this coupling body 7, the resin material constituting it enters the second concave portion 5d of the terminal body 5, as well.

By the way, the coupling body 7, for example, can be formed by positioning the end body 5 and the fixing body 6 inside a molding die, not shown in drawings, beforehand as described above, injecting the resin material before curing into the molding die, not shown in drawings, and then curing it.

The electrically conductive fixing member 4 is constituted by a plate-like metal such as iron, as shown in FIG. 1, and comprises a fixing portion 4a in which the side of its one end is formed in circular shape and a through-hole is formed at its center and a coupling portion 4b extending straight from the fixing portion 4a toward the other end and having its front end formed to be cylindrical to insert the other end of the connecting member 2. After the other end of the connecting member 2 is inserted into the coupling portion 4b, it is calked, thereby fixing the other end of the connecting member 2.

Figure 3:
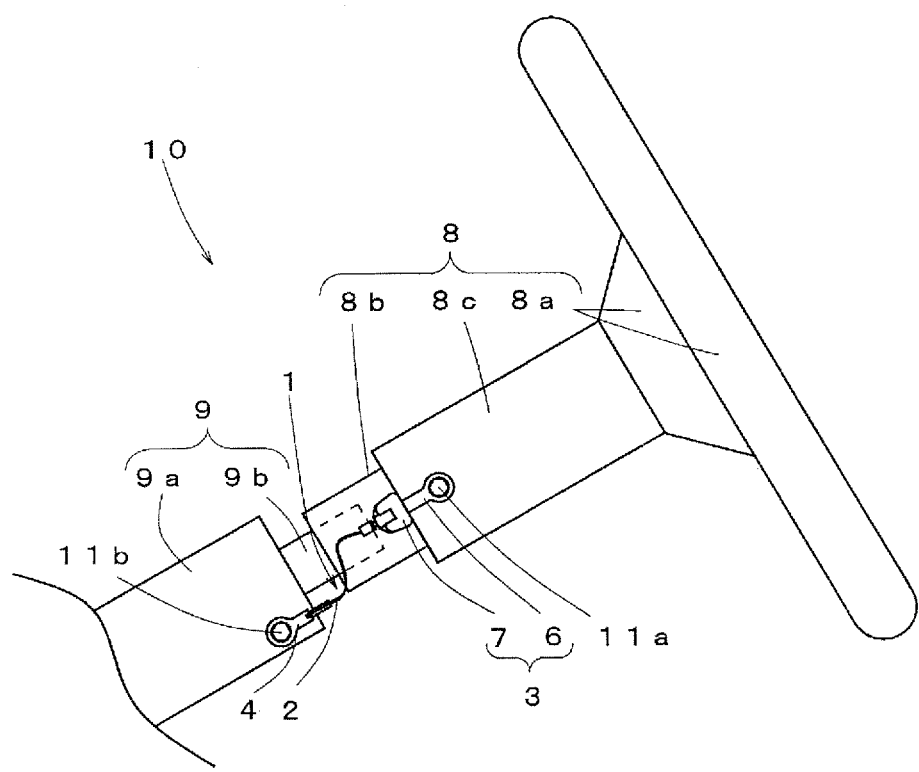
Figure 4:
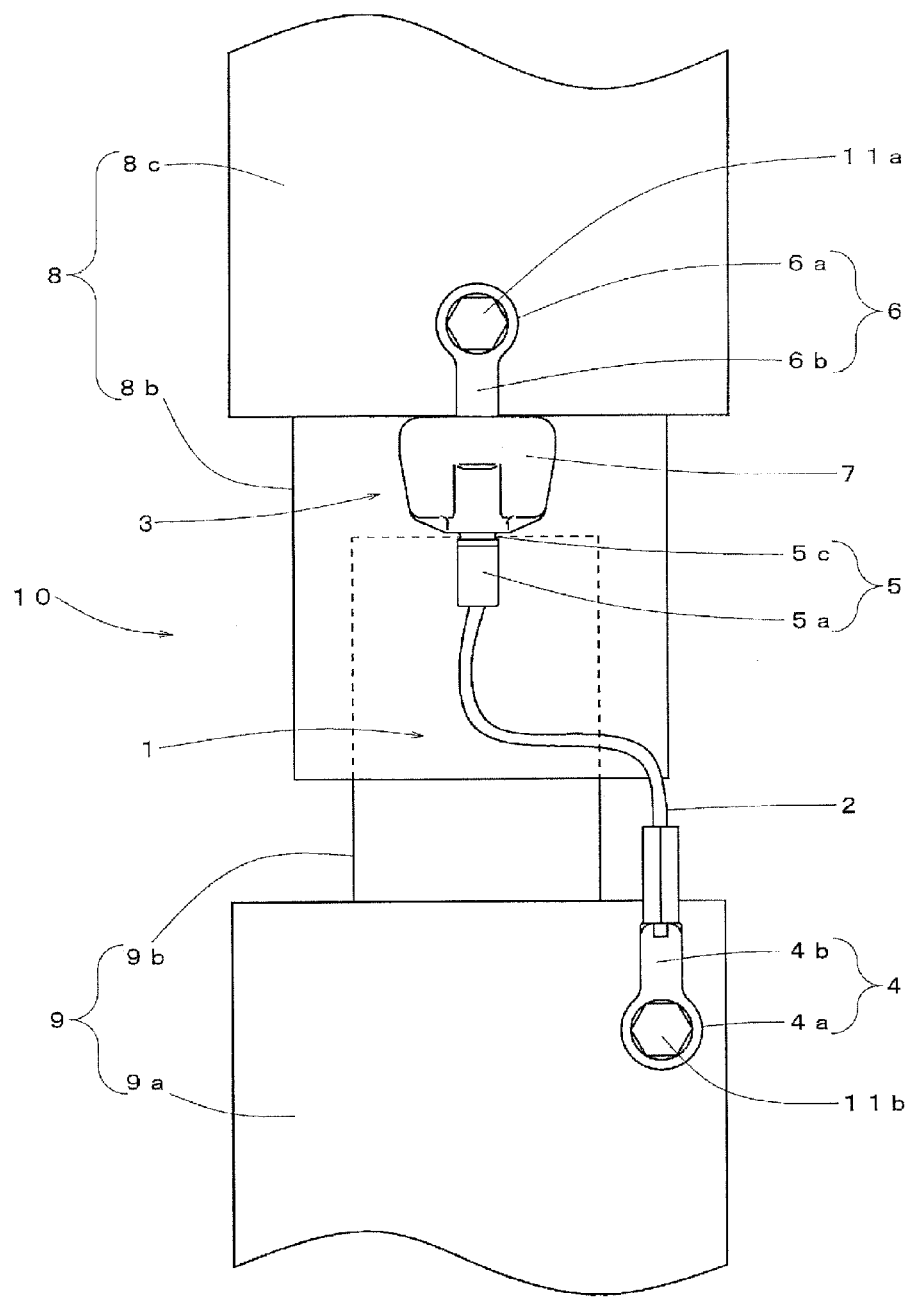

As shown in FIGS. 3 and 4, the mooring device 1 configured as described above can be used to construct a steering mooring mechanism 10 by mooring a steering operating mechanism 8 and a power steering mechanism 9 provided inside a vehicle not shown in drawings as the two electrically conductive members to be moored.

As shown in FIG. 3, the steering operating mechanism 8 is configured by a steering wheel 8a for a driver to operate, a cylindrical connecting portion 8b rotating in conjunction with the steering wheel 8a and opening at the front end used to connect to the power steering mechanism 9, and a steering column 8c containing an interlocking mechanism allowing the steering wheel 8a and the connecting portion 8b to operate in conjunction with each other.

The steering column 8c is configured by electrically conductive material such as metal. This steering column 8c is held in a vehicle, not shown in the above drawing, in a manner to be allowed to move in the directions toward and away from the power steering mechanism 9 in order to absorb the shock in the event of an accident.

As shown in FIG. 3, the power steering mechanism 9 assists the rotation by the driver of the steering wheel 8a, and is configured by a control box 9a for containing an assisting mechanism for assisting the rotation of the steering wheel 8a, and connecting shaft 9b projecting from the end of the controlling box 9a on its steering operating mechanism 8 side and inserted into the connecting portion 8b so as to rotate in conjunction with and together with the connecting portion 8b.

The control box 9a is configured by electrically conductive material such as metal, and held immovably in a vehicle, not shown in the drawing. The connecting shaft 9b is connected to the connecting portion 8b such as with non-conductive material, not shown in the drawings, sandwiched inbetween, in a manner to keep the non-conductive state between them. Additionally, the volume of the portion of the connecting shaft 9b inserted into the connecting portion 8b varies depending on the shock when the vehicle, not shown in the drawing, is involved in an accident, etc. so that the shock is absorbed by moving the steering operating mechanism 8 toward and away from the power steering mechanism 9 to protect the driver.

As shown in FIGS. 3 and 4, in the mooring device 1, the non-conductive fixing member 3 is fixed to the steering column 8c by fastening the bolt 11a, which has been inserted into the through hole provided on the fixing portion 6a of the fixing body 6, into the screw hole, not shown in the drawings, provided on the steering column 8c. Moreover, the electrically conductive fixing member 4 is fixed to the control box 9a by fastening a bolt 11b, which has been inserted into the through hole provided on the fixing portion 4a of the electrically conductive fixing member 4, into a screw hole, not shown in drawings, provided on the control box 9a. The steering mooring mechanism 10 is constructed by those fixations.

Here, the non-conductivity of the mooring device 1 is based on the configuration in which the end body 5 and the fixing body 6, not in contact with each other, are connected by the coupling body 7. Accordingly, electric conduction between the non-conductive fixing member 3 and other members, i.e. the connecting member 2 and an electrically conductive fixing member 4 does not exist. Moreover, because the connecting member 2 is arranged in such position as not to contact the non-conductive fixing member 3 or the member to be moored, another member is not required to ensure the prevention of electric conduction.

Therefore, in the steering mooring mechanism 10, electric conduction between the steering column 8c and the steering wheel 8a through the mooring device 1 does not exist, and because the connecting portion 8b and the connecting shaft 9b are connected with non-conductive state between them as described above, electric conduction does not exist between the steering operating mechanism 8 and the power steering mechanism 9. Therefore, no issues of generation of noise, heat and the like, and malfunction or damage of electronic components, etc in the vicinity do not arise.

Moreover, because the fixing portion 6a of the fixing body 6 of non-conductive fixing member 3 and the fixing portion 4a of the electrically conductive fixing member 4 are made of metal, the mooring device 1 can be fastened firmly to the steering column 8c and the control box 9a by bolts 11a, 11b.

Moreover, the mooring device 1 uses the fixing body 6 in which the fixing portion 6a fixed to the steering column 8c and the supporting portions 6c, 6d are spaced apart by the extending portion 6b provided inbetween. Therefore, in the mooring device 1, when fixing the fixing portion 6a to the steering column 8c, the fixing portion 6a is not affected by the thicker and larger coupling body 7 made of the resin material and covering the supporting portions 6c, 6d, etc.

Therefore, the fixation of the fixing portion 6a to the steering column 8c can be performed tightly and with a small space required.

Moreover, in the mooring device 1, the resin material constituting the coupling body 7 enters and fits to the second concave portion 5d of the end body 5, whereby the end body 5 can be prevented from coming off from the coupling body 7 when strong tensile force is applied to the end body 5.

Moreover, in the mooring device 1, the supporting portions 6c, 6d of the fixing body 6 covered by the resin material constituting the coupling body 7 extend in both directions perpendicular to the extending portion 6b, and thus when strong tensile force is applied to the fixing body 6, the tensile force can be distributed to supporting portions 6c, 6d. Therefore, the fixing body 6 can be prevented from coming off from the coupling body 7. Furthermore, because each of the side leg portions 6e, 6f of the fixing body 6 also covered by the resin material constituting the coupling body 7 extends in a parallel direction with respect to the extending portion 6b, when a strong torsional force is applied to the fixing body 6, the torsional force can be distributed to side leg portions 6e, 6f. Therefore, the fixing body 6 can be prevented from coming off from the coupling body 7.

Therefore, in the steering mooring mechanism 10, even in case the shock when a vehicle, not shown in the drawings, is involved in an accident and the like is so intense as to cause the connecting shaft 9b to come off from the connecting portion 8b and the steering operating mechanism 8 moves widely in the direction away from the power steering mechanism 9, the mooring device 1 ties the steering operating mechanism 8 to the power steering mechanism 9 and prevent it from falling, so that the driver's safety can be ensured.

By the way, the mooring device 1 and steering mooring mechanism 10 described in this embodiment are merely one aspect of the mooring device and the steering mooring mechanism according to the present invention, and various modifications can be realized without departing from the gist of the present invention.

For example, the mooring device 1 can be used not only for forming the steering mooring mechanism 10, but also for mooring two optional members to be moored. Particularly, the mooring device 1 can be used suitably when the two members to be moored are electrically conductive and are heavy in weight so that it is necessary to moor both of them in a manner not to allow electric conduction.

Moreover, by covering the connecting member 2 by non-conductive tube which has non-conductivity and flexibility, the connecting member 2 of the mooring device 1 may be configured not to conduct electricity even if contacting the non-conductive fixing member 3 or the steering column 8c. Moreover, non-conductivity may be ensured by coating the connecting member 2 with non-conductive material instead of using the non-conductive tube.

INDUSTRIAL APPLICABILITY

The mooring device according to the present invention can be used to moor the member to be moored. Moreover, the steering mooring mechanism according to the present invention can be used as a steering mooring mechanism for mooring a steering operating mechanism and a power steering mechanism in a vehicle.

EXPLANATION OF SYMBOLS

1 Mooring device
2 Connecting member
3 Non-conductive fixing member
4 Electrically conductive fixing member
5 End body
5d Second concave portion
6 Fixing body
6a Fixing portion
6b Extending portion
6c, 6d Supporting portion
6e, 6f Side leg portion
7 Coupling body
8 Steering operating mechanism
9 Power steering mechanism
10 Steering mooring mechanism

The invention claimed is:

1. A mooring device having fixing members fixed to each of two electrically conductive members to be moored, and a metal connecting member connecting the fixing members to each other,
wherein at least one of the fixing members is configured as a non-conductive fixing member having a metal fixing body fixed to the member to be moored, and a coupling body made of non-conductive material for coupling the fixing body and the connecting member in a manner not to contact each other, such that the connecting member is non-conductive with respect to the member to be moored on the side where the non-conductive fixing member is fixed,
wherein the fixing body has a fixing portion having a through hole used to fix to the member to be moored, an extending portion extending from the fixing portion to the connecting member side, and a supporting portion extending from an end of the connecting member side of the extending portion in both directions perpendicular to the extending portion, and the coupling body covers the supporting portion.

2. A steering mooring mechanism comprising the mooring device according to claim 1, wherein the members to be moored are a steering operating mechanism and a power steering mechanism in a vehicle.

3. The mooring device according to claim 1, wherein a metal end body having a concave portion is provided at an end of the connecting member, and the coupling body covers the concave portion of the end body.

4. A steering mooring mechanism comprising the mooring device according to claim 3, wherein the members to be moored are a steering operating mechanism and a power steering mechanism in a vehicle.

5. The mooring device according to claim 1, wherein the fixing body has side leg portions extending from a vicinity of both ends of the supporting portion in parallel to the direction in which the extending portion extends, and provided in a manner to sandwich the end of the connecting member inbetween, and the coupling body covers the side leg portions.

6. A steering mooring mechanism comprising the mooring device according to claim 5, wherein the members to be moored are a steering operating mechanism and a power steering mechanism in a vehicle.

7. The mooring device according to claim 5, wherein a metal end body having a concave portion is provided at an end of the connecting member, and the coupling body covers the concave portion of the end body.

8. A steering mooring mechanism comprising the mooring device according to claim 7, wherein the members to be moored are a steering operating mechanism and a power steering mechanism in a vehicle.

9. A mooring device having fixing members fixed to each of two electrically conductive members to be moored, and a metal connecting member connecting the fixing members to each other,
wherein at least one of the fixing members is configured as a non-conductive fixing member having a metal fixing body fixed to the member to be moored, and a coupling body made of non-conductive material for coupling the fixing body and the connecting member in a manner not to contact each other, such that the connecting member is non-conductive with respect to the member to be moored on the side where the non-conductive fixing member is fixed, and
wherein a metal end body having a concave portion is provided at an end of the connecting member, and the coupling body covers the concave portion of the end body.

10. A steering mooring mechanism comprising the mooring device according to claim 9, wherein the members to be moored are a steering operating mechanism and a power steering mechanism in a vehicle.

* * * * *